United States Patent [19]

Brown et al.

[11] Patent Number: 4,840,754
[45] Date of Patent: Jun. 20, 1989

[54] METHOD OF MOLDING ARTICLES

[75] Inventors: Gordon P. Brown; Robert L. Merker; Harry C. Morgan, all of Pittsburgh, Pa.

[73] Assignee: Ocutech, Pittsburgh, Pa.

[21] Appl. No.: 118,736

[22] Filed: Nov. 9, 1987

[51] Int. Cl.$^4$ .............................................. B29D 11/00
[52] U.S. Cl. ................................... 264/2.2; 264/319; 264/331.15; 264/331.18; 425/808
[58] Field of Search ................. 264/1.1, 1.7, 2.2, 319, 264/331.15, 331.18; 425/808

[56] References Cited

U.S. PATENT DOCUMENTS

| | | | |
|---|---|---|---|
| 2,304,664 | 12/1942 | Smith | 425/808 |
| 2,728,106 | 12/1955 | Herman et al. | 425/808 |
| 2,745,138 | 5/1956 | Beattie | 425/808 |
| 2,890,486 | 6/1959 | Cranden | 425/808 |
| 3,093,447 | 6/1963 | Crandon | 425/808 |
| 3,902,693 | 9/1975 | Crandon et al. | 425/808 |
| 4,166,088 | 8/1979 | Neefe | 264/2.2 |
| 4,209,289 | 6/1980 | Newcomb et al. | 264/2.2 |

FOREIGN PATENT DOCUMENTS

| | | | |
|---|---|---|---|
| 94153 | 11/1983 | European Pat. Off. | 264/1.1 |
| 1193422 | 11/1959 | France | 264/1.1 |
| 909574 | 10/1962 | United Kingdom | 264/2.2 |

Primary Examiner—James Lowe
Attorney, Agent, or Firm—Clifford A. Poff

[57] ABSTRACT

A method and apparatus for molding articles such as ophthalmic devices to provide high surface smoothness without the formation of flock anywhere on the molded articles. A predetermined quantity of moldable material is arranged between spaced apart molding surfaces between which as an outer boundary a meniscus is formed. The configuration of the meniscus is controlled as by moving the molding surfaces toward each other to produce convex rounding of the moldable material forming the meniscus. Heating of the molds is controlled to accelerate the polymerization of the moldable material. The molding surface are moved when the moldable material attains a predetermined gel state.

11 Claims, 5 Drawing Sheets

METHOD OF MOLDING ARTICLES

BACKGROUND OF THE INVENTION

1. Field of the Invention

The present invention relates to a method and apparatus for producing molded articles of manufacture comprised of thermo-curing materials including thermo-setting and thermo-plastic materials; and more particularly the present invention relates to the production of such articles wherein a meniscus of such material at a boundary to molding surfaces of a mold assembly during the solidification process is controlled and/or adjusted to provide a desired shape to the molded article in a manner which precludes the formation of flash anywhere on the article during the molding process.

2. Description of the Prior Art

Standard designs of conventional reusable molds provide at least one parting line established by the site of separation between top and bottom and/or inner and outer component mold parts. The parting line cannot be sealed against ingress of moldable material particularly liquids from the mold cavity. Therefore, the parting line fills with moldable material during the actual molding operations whereby an unwanted thin web section usually called flash is formed as an integral part of the molded object. For certain applications the parting line flash is of no consequence and can be left in place. For many applications, however, the flash must be removed. This can usually be accomplished by suitable machining operations. Alternative molding techniques and apparatus are needed when satisfactory machining operations cannot be accomplished as when, for example, the molded article comprises elastomeric material.

While not so limited, the present invention is particularly useful for producing molded articles useful in an as-molded-condition without surface modification to the molded article. Certain molded articles must comply with the requirement of a high surface smoothness throughout. A specific class of such molded articles is ophthalmic devices comprising intraocular, intracorneal and contact lenses. Such ophthalmic devices can be made from glass or clear plastic, e.g. polymethyl methacrylate, silicone rubber or hydrogel polymers. In this class of materials, silicone rubber, particularly hydrocarbon substituted polysiloxane offers desirable properties making this material well suited for ophthalmic devices. One recent development in the intraocular lens art provides that a lens made of molded silicone rubber can be folded for insertion through an unusually small incision at the limbal area of the eye.

In the manufacture of a silicone rubber intraocular lens, a two part liquid silicone polymer is thoroughly mixed and a desired quantity is introduced into one part of a mold cavity in a mold block that can be positioned in a cooperative relation with a second part of a mold cavity to form the lens. In the known method, the amount of liquid silicone polymer introduced into the mold cavity was always greater than the amount necessary to form the cured intraocular lens. In this way, it could be assured that the mold cavity is completely filled with silicone material. The excess silicone material extrudes out from the mold cavity when the two mold blocks are forced together under pressure while the curing process is completed. The curing is carried out by heating the molds to a predetermined temperature, about 150 degrees C., for a period of time sufficient to cure the silicone material. Curing is usually completed within about 15 minutes residence time in the mold at the curing temperature. Thereafter, the mold blocks are separated, and the molded lens remaining in one of the mold halves must be separated from a flashing consisting of a thin web of cured silicone rubber protruding from the outer periphery of the intraocular lens. The flashing is removed by tearing the flashing from the lens. The lens is then removed from the mold cavity in the mold block. The edge surface of the intraocular lens from which the flashing has been torn away is rough and irregular because the flashing is separated by applying sufficient force to shear the silicone material at the site where the flashing joins the intraocular lens. The site is a haptic part of the lens which functions to anchor, stabilize and position the lens after placement in the eye of the recipient. The present invention seeks to prevent pathology that may develop due to a rubbing or other trauma from contact over a period of time between the rough and irregular peripheral edge surface of the haptic which is the site where the flashing was torn away from the intraocular lens, and the ciliary sulcus or lens capsule.

In the past, ophthalmic devices were also made from hard, non-elastic materials such as glass or methylmethacrylate by first forming lens blank and then shaping the blank by grinding and other machining operations to impart a desired curvature and finish to the finished lens. Machining a lens blank in this manner was limited to a disc-like hemispherical shape, since the machining operations are performed by rotation of the lens blank. On the other hand, machining of elastomeric materials such as silicone rubber to form an ophthalmic device could not be carried out in this manner because the elastomeric material tears when machining or cutting is attempted. One teaching to overcome this shortcoming can be found in U.S. Pat. No. 3,874,124 wherein a lens blank made from elastomeric material is placed on a support surface and cooled to such an extent that hardness of the elastomeric material is increased so that a machining operation can be carried out in the presence of a liquid interface. However, such a machining of elastomeric material has not met with commercial success and is limited to circular and hemispherical geometrical shapes. After completion of the machining operation on the elastomeric material, it was necessary to eliminate contamination by the liquid interface from the elastomeric material. It was also found that the machined surface of the elastomeric material was hydrophobic and thus resisted wetting by tear fluid whereas the unmachined, molded surface of the lens exhibits good wetting properties.

SUMMARY OF THE INVENTION

It is an object of the present invention to provide a method and apparatus for producing a molded article by loading a predetermined quantity of moldable material into a mold cavity formed by spaced apart mold parts and a meniscus where surface tension on the moldable material in the space between the mold surfaces acts to define a boundary of the molded article.

It is a further object of the present invention to provide a method and apparatus for producing molded articles comprised of a predetermined quantity of moldable material which is supplied to a mold cavity formed by two spaced apart mold members which can undergo relative movement to impart a desired configuration to the surface of the moldable material at the space between the mold parts.

More particularly, according to the present invention there is provided a method for molding an article, the method including the steps of providing a mold having separable molding surfaces; loading a predetermined quantity of moldable thermal curing material in at least one molding surface of the mold, establishing a meniscus of the moldable thermal curing material defined by the spaced apart relation between the separable molding surfaces, and allowing the thermal curing material to attain a predetermined degree of polymerization.

The method preferably includes the further step of moving the separable molding surfaces of the mold toward each other to impart convex rounding of the moldable thermal curing material of the meniscus. The step of allowing the thermal curing material to attain to a predetermined degree of polymerization preferably includes dividing the reaction time into first and second time periods of which the first time period corresponds to a first degree of polymerization of the thermal curing material up to the step of moving the separable molding surfaces, and the second time period corresponds to a second degree of polymerization of the thermal curing material after the step of moving the separable molding surfaces. The second time period preferably extends to the complete cure of the thermal curing material. The apparatus of the present invention which is useful to carry out the method thereof includes first and second molding surfaces which can be brought into a spaced apart relation to define a meniscus established by moldable thermal curing material in the mold cavity, means for supporting the molding surfaces at a first spaced apart relationship, means for allowing displacement of one molding surface toward the other molding surface into a second spaced apart relationship corresponding to the desired dimension of the molded article, and means for allowing solidifying a moldable material in the mold cavity.

The material selected for introduction into the mold cavity in the method and apparatus of the present invention can be thermo-setting or thermo-plastic. When thermo-curing material is selected, time and temperature curing characteristics are used to determine the point of time when the mold parts can be moved together without imparting stress and strain to the molded article, i.e. before three dimensional cross-linking occurs. On the other hand, the gel state of the thermal curing material in the mold must be allowed to increase due to the polymerization process so that material at the meniscus between the molding surfaces can undergo a profile change so as to form a desired smoothly rounded profile which is free of an unwanted sharp edge. When themro-plastic material is selected, the material undergoes solidification in the mold cavity.

DESCRIPTION OF THE DRAWINGS

These features and advantages of the present invention as well as others will be more fully understood when the following description is read in light of the accompanying drawings in which.

DETAILED DESCRIPTION OF THE PREFERRED EMBODIMENT

Figure 1:
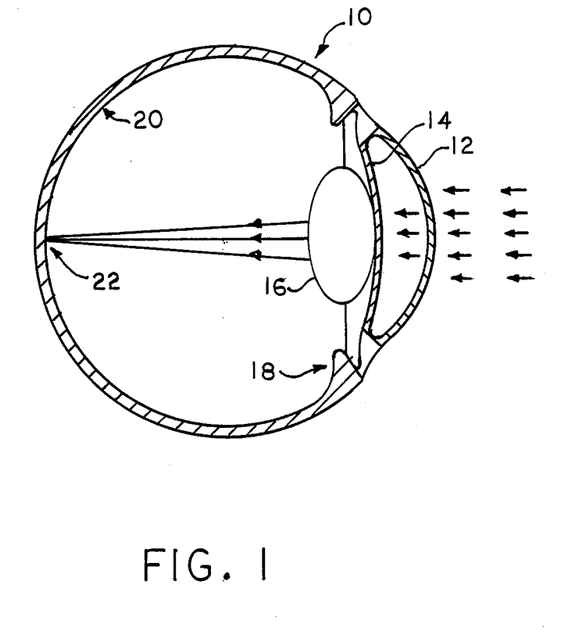
FIG. 1 is a side elevational view of a longitudinal section of a schematic representation of the human eye including a natural lens.

As described hereinbefore the present invention is not limited to but is particularly useful for producing ophthalmic devices. In FIG. 1 there is a schematic illustration of the human eye which is identified generally by reference numeral 10, and includes a cornea 12, an iris 14, a lens 16, the ciliary sulcus 18 adjacent to the lens, the retina 20 and the macula 22. As is well known, light rays are focused directly on the macula 22 by the cornea 12 and the lens 16. When the light bending properties of the cornea and lens fail to focus light rays clearly on the macula 22, the refractive properties of the eye can be modified through the use of an ophthalmic device to again bring incident light into focus on the macula. The refractive properties of the eye can be modified by placing a contact lens on the cornea 12.

A contact lens is one form of ophthalmic device which can be produced according to the method and apparatus of the present invention. The contact lens should have smooth surfaces blended together about the posterior and anterior surfaces of the lens. A unique characteristic of a contact lens when manufactured according to the present invention, is that the lens is entirely comprised of only molded surfaces and as such there are no surfaces or areas of the lens from which, for example, a flashing has been cut, machined or otherwise removed. A contact lens can be made according to the present invention from a moldable material selected from the group consisting of glass, polymethyl methacrylate, silicone rubber and hydrogel polymers.

Figure 2:
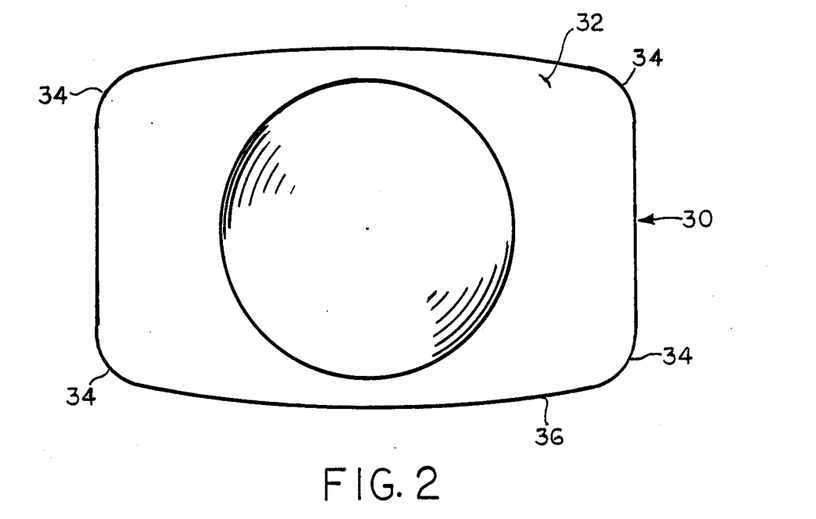
FIG. 2 is a plan view of one form of intraocular lens which has been made according to the method and apparatus of the present invention.
Figure 3:
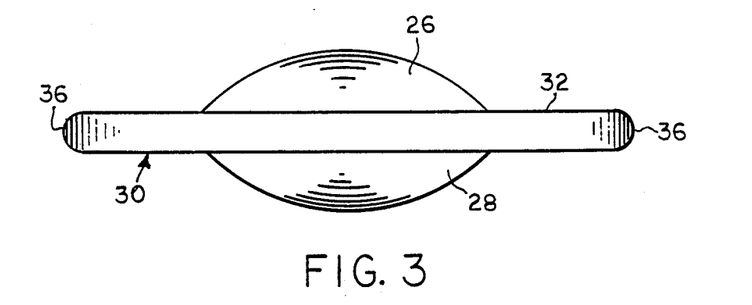
FIG. 3 is a side-elevational view of the lens shown in FIG. 2.

A second form of ophthalmic device which can be produced according to the present invention, is an intraocular lens which may comprise any of diverse configurations and constructions, one typical construction being shown in FIGS. 2 and 3. An intraocular lens is used to replace the lens 16 (FIG. 1) after the lens 16 is removed by surgery as commonly necessary because of a cataract. Shown in FIGS. 2 and 3, is an intraocular lens made up of two hemispheric like lens sections 26 and 28 facing in opposite directions from a centrally positioned haptic 30 having a planar web section 32 with a generally rectangular form and rounded corners 34. The haptic essentially includes a convexly rounded edge about the outer periphery of the planar web section 32 without flashing and sharp edges that might cause pathology. In the past, an intraocular lens of the type shown in FIGS. 2 and 3 was made, as described hereinbefore, by a molding process that resulted in the production of a flashing extending from an attachment site around the entire outermost periphery of the outer edge of the haptic. When the flashing was torn away from the lens, the resulting face surface about the outer edge of the rib of the haptic was rough, irregular and sometimes required additional cutting operations to remove parts of the flashing. The present invention provides for the manufacture of a molded intraocular lens wherein no flashing is produced anytime, including during the molding of the lens material. The lens is used in an as-molded condition without alteration including surface machining operation. There may be, of course, post molding treatment of the lens, for example, sterilization.

A third type of ophthalmic device which can be produced according to the present invention is an intracorneal lens that can be implanted in the cornea to adjust the refractive powers of the cornea. Such a lens resembles a contact lens but an intracorneal lens has a smaller diameter and a thinner wall thickness as compared with a contact lens. An intracorneal lens is produced in essentially the same manner as will be described hereinafter by a method and apparatus for producing a contact lens.

Figure 4:
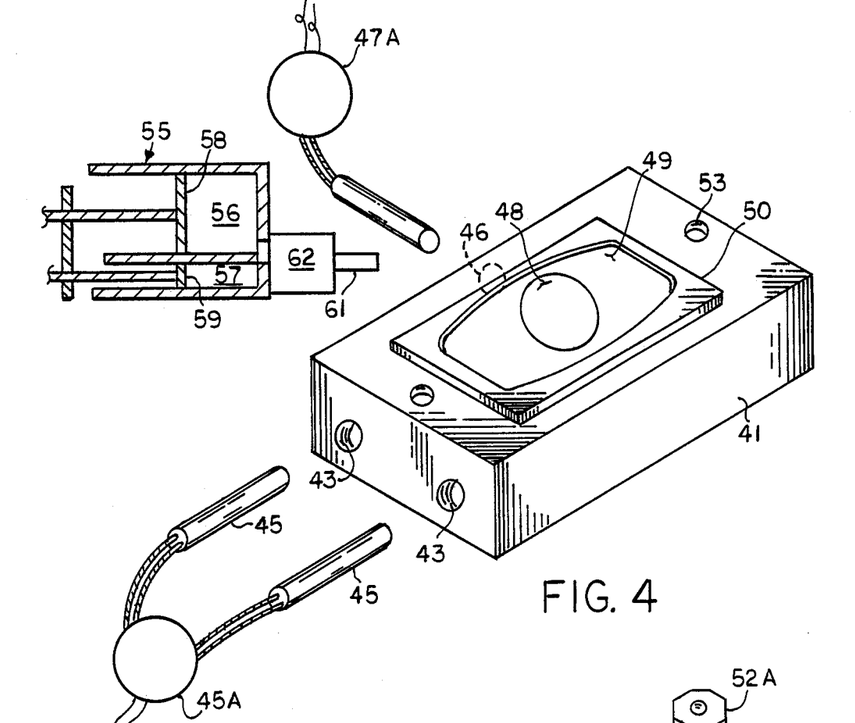
FIG. 4 is an isometric view of one mold part including a molding cavity therein for producing the intraocular lens shown in FIGS. 2 and 3.
Figure 5:
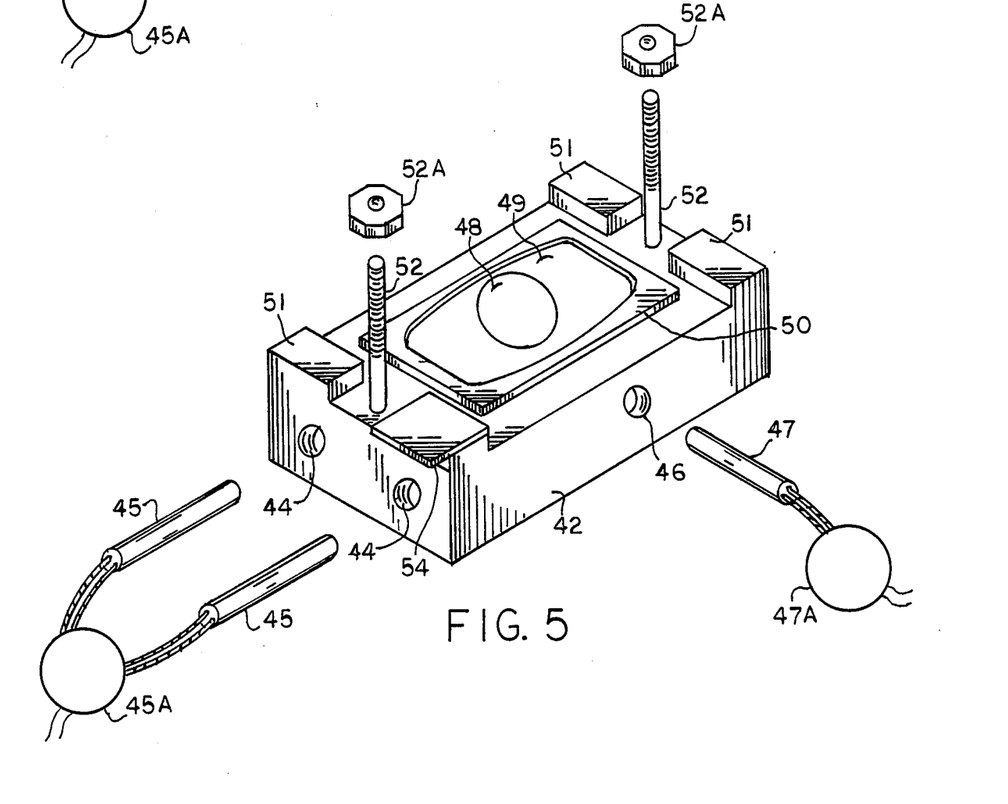
FIG. 5 is an isometric view of a mold part including a mold cavity to cooperate with a mold cavity in FIG. 4.

Turning now to one embodiment of the present invention, in FIGS. 4 and 5 there is illustrated a mold assembly which includes mold halves 41 and 42 having general form of rectangular blocks of metal each provided with spaced apart and generally parallel drilled openings 43 and 44 into which there are positioned cartridge type electrical heaters 45 controlled by controllers 45A whereby the mold halves can be heated to a desired temperature and maintained at a desired temperature during thermal curing of the liquid silicon rubber in the mold cavities. The cartridge heaters are retained in the openings by suitable means, such as a potting compound. The mold blocks include one, or more if desired, bored opening 46 wherein a thermocouple 47 is placed to position the temperature responsive portion thereof closely adjacent to concave optic mold surfaces 48 used to form the lens portions of an intraocular lens. Numerical read-out gauges 47A provide temperature measurement that can be used by an operator to operate controllers 45A. An automatic controller such as a microprocessor can be used to control the heaters 45 in response to output signals from the thermocouples 47. The thermocouples can be held in place by suitable means such as a potting compound. Surrounding the concave optic molding surfaces 48 in the molds are relatively shallow haptic molding surfaces 49 that can be defined in a separable insert 50 removably secured to a mold block 41. The insert may, when desired, include an optic molding surface 48.

It should be understood that it is arbitrary to designate top and bottom mold halves because a mold can be set on a support surface in a manner where either of the mold assembly halves can be a bottom or a top mold half. A raised pad 51 is provided at each of the four corners of the rectangularly shaped mold block 42. The pads have equal upstanding heights which extend as shown in FIG. 5 equal distances above the insert 50 and the haptic molding surface 49. Between the pads 51 at each of opposite ends of the mold half, there is an upstanding elongated guide shaft 52 having a threaded end portion that can threadedly engage with a fastener 52A such as a nut member. Mold half 41 is provided with openings 53 at spaced apart locations to guide and slidably receive the guide shafts which have a length sufficient to pass through mold half 42 and protrude from the surface of mold half which is opposite the surface where haptic molding surface of insert 50 is found. Shown in FIG. 5 are spacers 54 which are supported on the exposed face surfaces of the raised pads. It is to be understood that the thickness of the four spacers is preselected according to a desired amount of rounding to be imparted to the thermal curing material forming a meniscus between molding surfaces as will be explained in greater detail hereinafter. The spacers 54 can be replaced by spaced apart shafts threadedly engaged with threaded bores in one mold half and projecting into engagement with the other mold half so that by adjusting the shafts the spacing between the molding surfaces can be selectively adjusted. Identified by reference numeral 55 is a schematic illustration of a material discharge device in FIG. 4 which operates to supply a predetermined quantity of a moldable thermal curing material into one or, if desired, both halves of the mold parts. One material for molding lenses, in accordance with the present invention is silicone rubber, particularly hydro-carbon substituted polysiloxane. The material is a two-part system, which after mixing together in a prescribed ratio undergoes polymerization to a complete cure. Heating this material above ambient temperature only accelerates the cure time. The dispenser 55 includes storage chambers 56 and 57 having cross sectional areas corresponding to the prescribed ratio of the two components which reside in the respective chambers and which are discharged by separate plungers 58 and 59. A tie bar interconnects the plungers to move equal distances along graduation marks used to determine the preselected quantity of liquid silicon rubber components discharged from conduit 61 into the mold cavity. A static mixing chamber 62 receives the prescribed quantities of liquid silicon rubber from passageways communicating with chambers 56 and 57 and delivers a thoroughly mixed flowstream to conduit 61.

Figure 6:
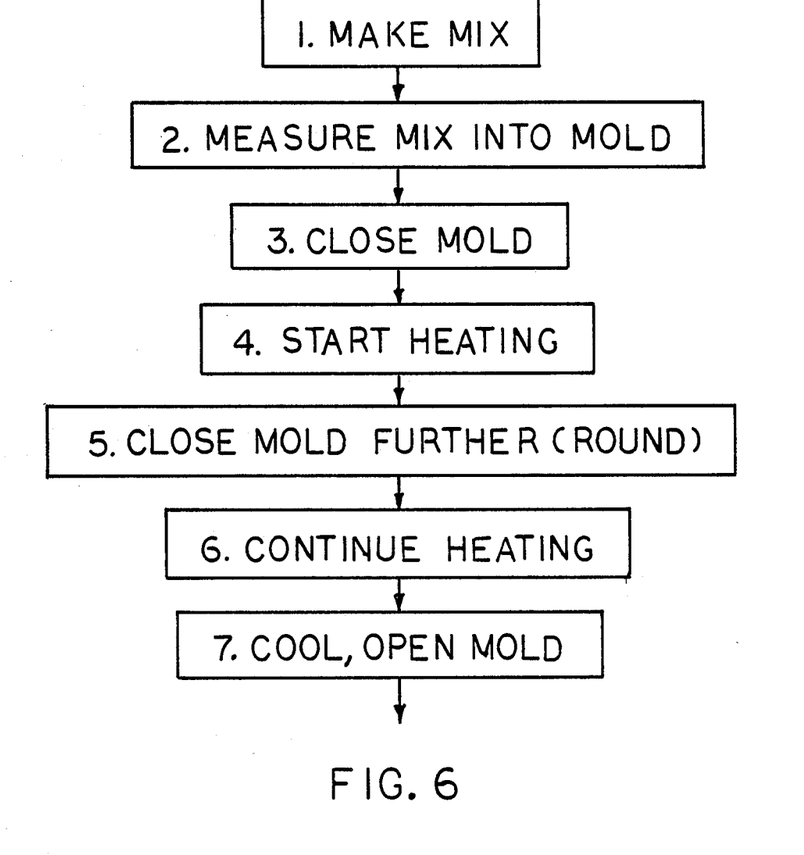
FIG. 6 is a flow diagram of a preferred embodiment of the present invention.
Figure 7:
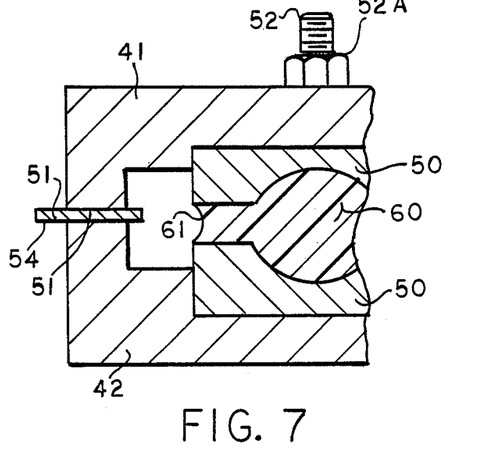
FIG. 7 is an enlarged elevational view in section of the mold parts at a first spaced apart position for carrying out the method of the present invention.
Figure 8:
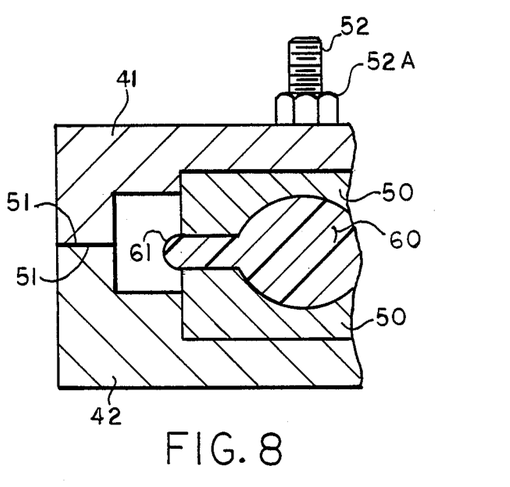
FIG. 8 is a view similar to FIG. 7 and illustrating the mold parts at a second spaced apart position.

As illustrated by the flow diagram of FIG. 6, when the moldable material is comprised of a multicomponent, the components are first mixed together and a measured quantity is introduced onto one of the mold cavities. The mold is then closed by placing one mold half on the other whereby the guide shafts 52 slide along to the openings of the mold half 41. A spacer 54 is located on each of the pads 51 between the mold parts so as to maintain a prescribed separation between the molding surfaces in the two mold parts. Fasteners 52A are used to firmly secure the two mold parts together. When fasteners are in the form of nut members they can be tightened on threaded ends of the shaft members. The thickness of the spacers 54 are carefully preselected so that the molding surfaces will be spaced apart from one another to form a meniscus at the gap between the two molding surfaces. If not already initiated, this assembly of mold parts is partly shown in FIG. 7. It can be seen that the mass of thermal curing moldable material 60 is comprised of a preselected quantity which is sufficient to wet all the molding surfaces 48 and 49 and fill the space between the respective oppositely positioned corresponding molding surfaces. The volume of moldable material is such that when the spacers 54 are in place, the meniscus 61 will assume a prescribed shape, namely, concave (as shown in FIG. 7); generally planar or convex. The magnitude of the convex shape should be small because of the natural tendency of the liquid polymer to flow from the mold cavity. For this reason it is preferred to establish a meniscus having a concave configuration whereby surface tension facilitates the maintaining of the meniscus without breakouts or leakage of the liquid polymer. Surface wettability of the molding surfaces by the liquid polymer is also a factor affecting the meniscus and can be used to control the shape of the meniscus. Current is applied to the cartridge heaters to speed the polymerization process. Depending on the particular polymer, the molds are heated to a predetermined temperature, such as, for example, 150 degrees C. At this temperature, the polymerization process is allowed to continue to the extent that the liquid polymerized in the mold cavity approaches a gel state. At a selected time when the polymer material is between, for example 70 and 100 percent of a gelled state, the fasteners 52A are released so that the spacers 54 can be removed. After the spacers are removed, fasteners are again tightened so as to bring the molding surfaces in the two mold parts closer together whereby the gap between the molding surfaces is reduced. This relationship of parts is shown in FIG. 8 and causes the meniscus to undergo a rounding to form a desired convex profile in cross section. The mold parts must be moved together sufficiently so that rounding does occur to an extent necessary to prevent the formation of sharp edges on the periphery of the haptic at the conclusion of the molding process. Thereafter as shown in FIG. 6, heating of the mold is continued for the prescribed period of time sufficient to cure the polymer. The cured polymer is notably characterized by the fact that polymerization has proceeded through cross linking of the polymer. At the end of the curing process, heating of the mold is terminated and, if desired, the mold can be artificially cooled to a temperature to permit safe handling. The mold can be opened by first removing the fasteners 52A and then separating the mold halves from one another. The molded article will reside in one of the mold halves and can be removed from the mold cavity thereof. The mold halves can then be prepared for the production of additional lenses. It is to be understood that the curing process for silicone rubber will proceed without heating the mold although the curing time will be substantially lengthened. Thermo-setting material is also responsive to time and temperature conditions.

Figure 9:
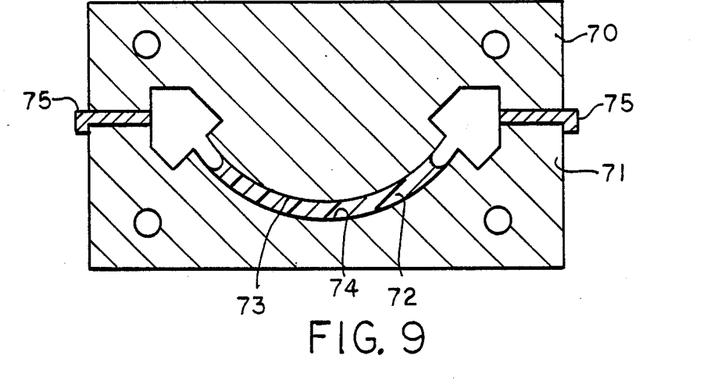
FIG. 9 is an elevational view in section of two mold parts in a spaced apart relation for producing a contact lens.
Figure 10:
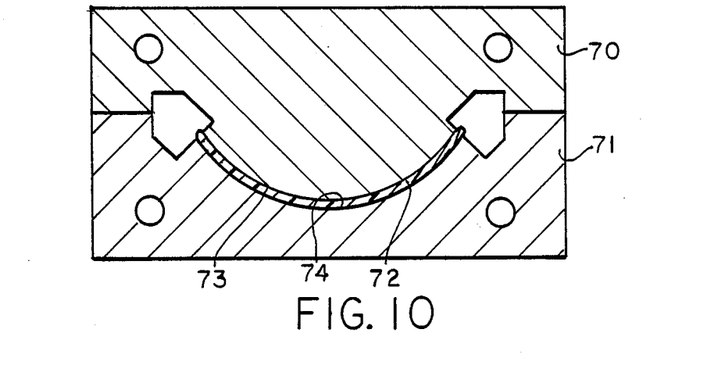
FIG. 10 is a view similar to FIG. 9 and illustrating the mold parts in a second spaced apart relation.

In FIGS. 9 and 10 there is illustrated an arrangement of mold halves for producing a contact lens. Again it is preferred to produce the contact lens from silicone rubber although polymethyl methacrylate and hydrogel polymers can be used. The mold halves 70 and 71 are constructed in a manner which is similar to that already described in FIGS. 4 and 5. However, the mold cavity 72 is generally hemispherical which defines molding surface 73 with a concave hemispherical shape and mold surface 74 with a convex hemispherical shape. The mold cavity is established by positioning the two mold surface in a spaced apart and interfitting relation. A meniscus is formed at the outer peripheral edge of the moldable material in the mold. After a predetermined quantity of liquid polymer is introduced onto surface 73, the other mold part 71 is positioned on exposed faces of spacer members 75 whereby the two mold parts are spaced apart so that the mold surfaces 73 and 74 of the mold parts never form a closed mold cavity.

Cartridge heaters and thermocouples are introduced in the openings in the molds as shown and described hereinbefore to heat the mold and give measurements of the temperature to which the mold is heated. The thermocouples are important for establishing the duration of the polymerization process when the polymer has proceeded to a desired gel state. The mold parts are held together securely by threaded fasteners that engage anchor posts extending from one mold part through openings in the other mold part. After the fasteners are secured in place, the mold is heated in a manner as described previously to a temperature until the polymer obtains a desired gel state. When this occurs, the fasteners are released sufficiently so that the spacer members 75 can be removed and the mold parts moved toward one another by a distance corresponding to the distance defined by the thickness of the spacers. The fasteners are then used to secure the mold parts in the newly repositioned relationship and the polymerization process continues by continued heating of the mold. Before the mold parts are moved together, as shown in FIG. 9, the meniscus that is established about the outer periphery of the lens is planar or slightly concave. The form of the meniscus is reshaped by producing a bulging or rounding when the spacers are removed and the mold parts are moved closer together so that no sharp edges exist at the meniscus and at the demarcation site between the meniscus and lens surfaces controlled by the molding surfaces of the mold halves. The polymer is then cured through continued heating of the mold. At the end of the curing process the fasteners are removed and the mold parts are separated. The molds are cooled and the molded contact lens can be removed from the mold half in which the lens resides. An intracorneal lens can be molded in essentially the same manner as just descibed for molding a contact lens.

It is an important feature of the present invention that there is no flashing ever produced during the production of the molded article. The meniscus that is established about the periphery of the molded article can be situated at any desired position, but it is important, of course, to ensure that no sharp edges occur. Also, the meniscus is created by a formation of a spaced apart relation between molding surfaces and the moldable material which is placed in the mold cavity. If the moldable material is too liquid, then the surface tension may be inadequate to prevent leakage of the material and a meniscus will not form. When a desired profile of the meniscus can be established between molding surfaces without moving the mold halves toward each other during the curing process, then such relative movement of the mold halves can be eliminated from the process.

While the present invention has been described in connection with the preferred embodiment shown in the various figures, it is understood that other similar embodiments may be used or modifications and additions may be made to the described embodiment for performing the same functions of the present invention without deviating therefrom. Therefore, the present invention should not be limited to any single embodiment, but rather construed in breadth and scope in accordance with the recitation of the appended claims.

We claim:

1. A method for molding an article, the method including the steps of:
   providing a mold having separable molding surfaces;
   loading a predetermined quantity of moldable material on at least one molding surface of the mold;
   positioning the molding surfaces of the mold into a spaced apart relation to establish a meniscus of moldable material in the gap about the periphery of the moldable material;

causing said meniscus to attain a convex curvature extending outwardly of the gap between the molding surfaces; and finalizing the molding of the moldable material to form the article while maintaining said meniscus with a convex curvature.

2. The method according to claim 1 wherein said step of causing includes moving the separable molding surfaces of said mold toward each other to cause convex rounding of said meniscus.

3. The method according to claim 1 wherein said step of positioning includes positioning said separable molding surfaces at a first predetermined spaced apart relation, said step of causing including adjusting the position of the separable molding surfaces relative to each other to form a second predetermined spaced apart relation.

4. The method according to claim 1 wherein said moldable material is thermal curing and said method includes the further step of dividing the time for thermal curing of the moldable material into first and second time periods of which the first time period corresponds to the attainment of a first degree of polymerization of the thermal curing material by said step of positioning the molding surfaces and the second time period corresponds to the attainment of a second degree of polymerization of the thermal curing material after said step of positioning the molding surfaces.

5. The method according to claim 4 wherein said second time period extends to the desired complete cure of the thermal curing material.

6. The method according to claim 4 wherein said first degree of polymerization of the thermal curing material corresponds to the attainment of a desired gel state of the thermal curing material.

7. The method according to claim 1 wherein said thermal curing moldable material comprises thermo-setting moldable material.

8. The method according to claim 1 wherein said moldable material comprises thermo-plastic material.

9. The method according to claim 1 wherein said moldable material is thermal curing and said method includes the further step of heating said mold for thermal curing of the moldable material for first and second time periods of which the first time period corresponds to the attainment of a first degree of polymerization of the thermal curing material before said step of causing the meniscus to attain a convex curvature and the second time period corresponds to said step of finalizing.

10. The method according to claim 9 where in said first degree of polymerization of the thermal curing material corresponds to the attainment of a desired gel state of the thermal curing material.

11. The method according to claim 1 wherein said step of loading a quantity of thermal currring moldable material includes measuring a predetermined quantity of such material for introduction in a mold cavity of said mold.

* * * * *